United States Patent

[11] 3,587,692

| [72] | Inventor | Arthur O. Nelson<br>Park Ridge, Ill. |
|---|---|---|
| [21] | Appl. No. | 836,493 |
| [22] | Filed | June 25, 1969 |
| [45] | Patented | June 28, 1971 |
| [73] | Assignee | New-Nel Kitchens Products Company<br>Chicago, Ill. |

[54] VEGETABLE SHREDDER
7 Claims, 4 Drawing Figs.

| [52] | U.S. Cl. | 146/160 |
|---|---|---|
| [51] | Int. Cl. | A47j 43/04 |
| [50] | Field of Search | 146/160, 159 |

[56] References Cited
UNITED STATES PATENTS

| 1,610,322 | 12/1926 | Reich | 146/160 |
|---|---|---|---|
| 2,478,515 | 8/1949 | Vincent | 146/160 |
| 3,083,747 | 4/1963 | Zysset | 146/160 |

Primary Examiner—Willie G. Abercrombie
Attorney—Davis, Lucas, Brewer & Brugman

ABSTRACT: A vegetable shredder having a reciprocally movable shredding blade enclosed in a bell-shaped housing and a tray removably attached at the bell end of the housing, the interior of the bell end portion of the housing and the attached tray forming a shredding chamber which is readily opened for discharge of shredded material by removal of the tray.

PATENTED JUN 28 1971
3,587,692
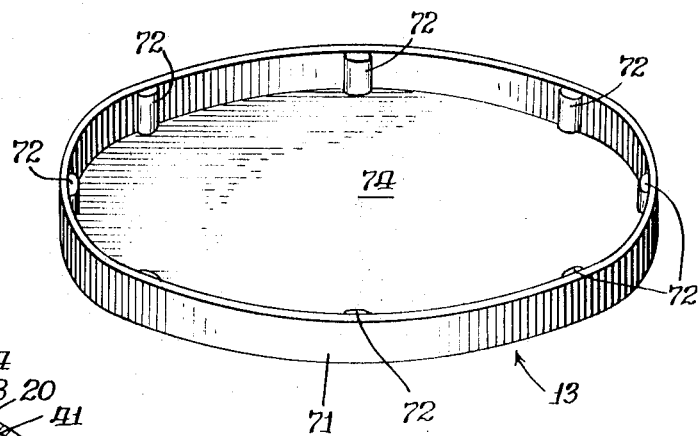
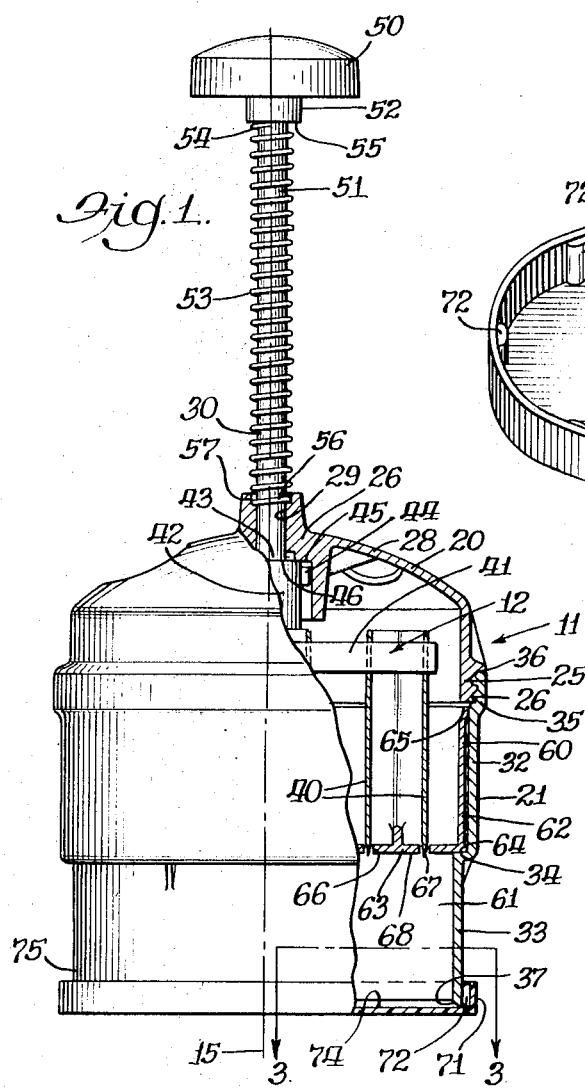
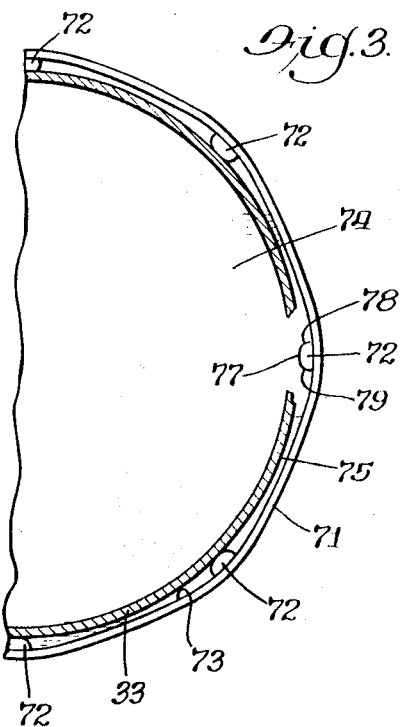
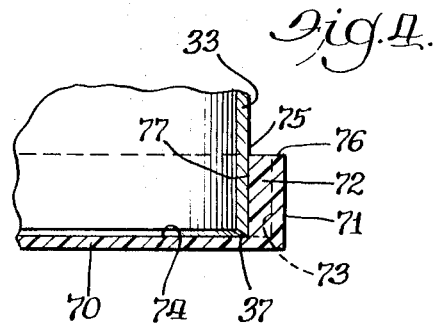
Inventor:
Arthur O. Nelson
By:
Davis, Lucas, Brewer & Brugman
Attys.

VEGETABLE SHREDDER

BACKGROUND OF THE INVENTION

This invention relates generally to the food chopping and shredding art and in particular to a unitary food shredder having an enclosed self-contained shredding chamber which is readily opened for discharge of material shredded therewithin.

One method commonly used in the preparation of food dishes and ingredients for food dishes, comprises chopping or shredding food material into particulate form. Several types of devices are used for this purpose, such as, for example, blenders, grinders and reciprocating knife-blade shredders. This invention relates to the latter type of device, of which that described in the U.S. Pat. issued to K. Zysset on Feb. 26, 1957 and entitled "Vegetable Shredder" is typical. In such known shredders an indispensable adjunct is a rigid flat chopping surface against which the knife blade of the shredder is directed to cut the material to be shredded. A bread board or chopping board is generally used for this purpose rather than a table top or work counter surface, because the shredding knife would mar the table or counter surface, and importantly, after shredding the food material and removing the shredding device therefrom, the shredded material must be transferred to and deposited in a bowl, pan or other such food preparation or serving receptacle. In addition to the obvious inconvenience of employing and cleaning and adjunctive accessory, such accessories are inefficient and generally unsuited for effective shredding. For example, unless the cutting board employed has a large surface, and hence is correspondingly cumbersome and unwieldy to use, the shredded particles, upon lifting the shredder, will tumble outwardly and spill over the edge of the cutting board. Further, unless the cutting board itself is carefully handled during the transfer operation and the shredded particles struck neatly therefrom, more spillage may occur. A further, and annoying disadvantage of the above-described shredding process arises in shredding and chopping juicy vegetables, the juice of which must also be collected and transferred to a cooking receptacle. Two difficulties are encountered in this instance. First, if the vegetable is very juicy, such as, for example, a tomato, the juice will overflow the cutting board and be lost. Second, if the vegetable has little or a very limited amount of inherent juice, but the juice is essential such as, for example, an onion, such scanty quantities of juice may be lost by absorption in the cutting board itself or be irretrievable therefrom in the striking operation.

SUMMARY OF THE INVENTION

This invention overcomes the described, and other, disadvantages of the shredding devices heretofore known by providing a unitized shredding device including a bell-shaped housing, open at its base end, and mounting therewithin a cutting mechanism having a blade movable reciprocably in said housing toward and away from said base end and a tray removably attached to said housing at said base end and cooperating with said housing and said cutting mechanism to provide an enclosed shredding chamber in which the interior surface of said tray also forms a cutting board surface adapted to receive said blade for cutting the material to be shredded, and wherein said tray is readily removed to discharge shredded material contained therewithin.

It is therefore a principal object of this invention to provide a food shredder having a body open at its base end and mounting a reciprocally movable shredding blade mechanism therewithin, and a tray which is removably engageable with the body at its base end and which forms a shredding surface adapted to cooperably receive the shredding blade for shredding food thereagainst.

It is a further object of this invention to provide a food shredder having a body open at its base end and mounting a reciprocally movable shredding blade mechanism therewithin, and an associated tray which is removably engaged with the body at its base end and which forms an enclosed shredding chamber in combination therewith for containing food shredded therein, the shredder being transportable to a location remote from the shredding location without the need for auxiliary equipment and where the shredder is readily opened for discharge of such shredded food.

These, and other objects and advantages, will be readily recognized by reference to the following detailed description of the preferred embodiment of this invention and in which description reference is made to the accompanying drawing in which:

FIG. 1 is an elevational view of the shredder of this invention in which a portion of the body is fragmented to reveal the elements of this invention;

FIG. 2 is an isometric view of the tray of the shredder of FIG. 1 and which is removed therefrom for more detailed illustration;

FIG. 3 is a partial sectional view of the shredder of FIG. 1 taken along the lines 3–3 and viewed in the direction of the arrows thereon; and FIG. 4 is an enlarged partial view in cross section of the lower right-hand corner portion of FIG. 1, and illustrating the interconnection of the tray portion with the housing portion of the shredder of FIG. 1.

The presently preferred embodiment of my invention is illustrated in the accompanying drawings wherein FIG. 1 shows the food shredder, indicated generally by the numeral 10, in its operative upright position. As there shown, the food shredder 20 comprises generally a bell-shaped housing 11 mounting a reciprocably movable food cutting mechanism 12, and a removable tray 13. The food cutting mechanism 12 and the housing 11 are analogous to the class of vegetable shredders employing reciprocably moved knife blades for cutting vegetables, and of which class the "Vegetable Shredder" of the U.S. Pat. No. 2,782,826 issued on Feb. 26, 1957 to Karl Zysset is typical.

As shown in the fragmented portion of FIG. 1, the bell-shaped housing 11 comprises an upper bell part 20 and a lower cylindrical part 21 which are threadedly interconnected and define a common central axis 15. Such two-part construction facilitates formation and assembly of the shredder 10, and in addition, simplifies cleaning the shredder 10 after each use. However, it will be understood that while such two-part construction is presently preferred, the housing 11 may be formed in other shapes and arrangements to suit manufacturing convenience and consumer appeal. Preferably, the housing 11 is formed of polystyrene, which material is selected for its transparent nontoxic character, and its substantial impact resistance. Referring further to FIG. 1, the upper bell part 20 includes male threads 25 adjacent its lower end 26, and a hub portion 27 concentric with central axis 15 and extending axially above and below its concave top portion 28. The hub portion 27 is provided with a bore 29 concentric with central axis 15 and arranged to receive the stem 30 of the cutting mechanism 12 for reciprocal sliding movement therealong. The lower cylindrical part 21 of the housing 11 is stepped down approximately midway along its axial extent, the upper wall portion 32 having a greater diameter than the lower wall portion 33 and defining an inner circumferential shoulder 34 therebetween. Female threads 35 are provided adjacent the upper end 36 of the upper wall portion 32 for mating threaded engagement with the male threads 25, and the open lower end of the lower wall portion 33 is chamfered to define a sharp circumferential terminal edge 37.

Referring further to FIG. 1, the food cutting mechanism includes a cutting knife 40 having a zigzag configuration when seen in plan view (not shown), but which in the fragmented elevation view of FIG. 1 is distinguished by the vertically cut section. The zigzag blade portions of the blade 40 are rigidly interconnected by a spanning metal bar 41 which extends transversely thereacross through appropriate openings provided in the blade 40. The bar 41 is interconnected with the stem 30 by a connecting metal sleeve 42 which is attached, as by welding or brazing, at one end to the bar 41 at its midpoint, and at the other end to the lower end portion 43 of the stem 30. Preferably, to assure a concentric relationship between the connecting sleeve 42 and the stem 30 with respect to central axis 15, the connecting sleeve 42 is provided with a concentric bore (not shown) arranged to receive the lower end portion 43 of the stem 30 in a tight press fit, and the interconnected parts are then drilled through to receive a cotter pin 44. As shown in FIG. 1, the interior end wall 45 of the hub portion 27 forms a shoulder adapted to abuttingly receive the upper end 46 of the connecting sleeve 42, and thereby limit the upward movement of the connecting sleeve 42 and its associated movable elements. A handle 50 is attached to the upper end portion 51 of the stem 30, the handle 50 being provided with a counterbore (not shown) in its hub extension portion 52 into which the upper end portion 51 is pressed to assure firm interconnection therebetween. A compression spring 53 is provided on the shaft 30, the upper end coil 54 of the spring 53 bearing against the lower end surface 55 of the hub extension portion 52 of the handle 50, and the lower end coil 56 being received in an annular recess 57 provided in the hub portion 27. As thus arranged, reciprocal movement of the blade 40 toward and away from the tray 13 along the central axis 15 is accomplished by pressing downwardly on the handle 50 to move the blade 40 toward the tray 13, and releasing the downward force to permit the spring biased blade 40 to rise away from the tray 13 and return to its initial position.

A partition guide member 60 having a basket shape, and formed of the same material as the housing 11, is provided interiorly of the housing 11 to isolate the shredding chamber 61, to guide the knife blade 40 as it is moved reciprocally upwardly and downwardly, and to wipe the blade 40 free of shredded material as it returns to its upper position in the housing 11. The partition guide member 60 includes a cylindrical portion 62 and an integral generally planar end wall 63. The cylindrical portion 62 has an outside diameter slightly less than the inside diameter of the upper wall portion 32, and an axial extent slightly less than the distance between shoulder 34 of the lower cylindrical part 21 and the lower end 26 of the upper bell part 20 when, absent the partition guide member 60, the two housing parts are threadingly engaged to their fullest extent. Thus, with the partition guide member 60 disposed in its assembled position with in the housing 11, the outer peripheral margin 64 of the end wall 63 rests on the shoulder 34 of the lower cylindrical part 21 and the upper end 65 of the cylindrical portion of the partition guide member 60 is slightly spaced from the lower end 26 of the upper bell part 21, to permit free rotation of the partition guide member 60 within the housing 11. A zigzag slit 66, which conforms with the zigzag configuration of the knife blade 40, is provided through the end wall 63 to receive the knife blade 40 for guided reciprocal movement with respect thereto. As shown in FIG. 1, the knife edge 67 of the knife blade 40, even when in its uppermost position, extends downwardly through the end wall 63 and slightly below the bottom surface 68 thereof so that the knife blade 40 is continually engaged within the slit 66 in the assembled shredder.

As thus arranged and constructed, the knife blade 40 of the shredder 10 is manually movable through a vertical reciprocal traverse along the central axis 15 by alternate depression and release of the handle 50, and is rotatable together with the partition guide member 60 about the central axis 15 with respect to the shredding chamber 61 in response to rotatable movement of the handle 50 or by periodic rotation of the housing 11 to direct successive food cutting strokes to uncut portions of food held in the shredding chamber 61. In this regard, the blade indexing mechanism in the said U.S. Pat. No. 2,782,826 to K Zysset offers an alternative means for assuring thorough cutting of the food to be shredded into substantially uniform discrete portions.

The tray 13, shown pictorially in FIG. 2, and illustrated in assembly with the other components of the shredder 10 in FIGS. 1, 3 and 4, includes a generally planar base portion 70, an integral cylindrical flange portion 71, and a plurality of lugs 72 spaced circumferentially along the inner wall 73 of the flange portion 71. The tray 13 is preferably formed of a tough pliable nontoxic plastic material such as flexible unfilled polyvinyl chloride which is flexurally durable to withstand repeated engagement with, and removal from, the housing 11, and yet provides a tough planar cutting surface 74 to withstand repeated impact by the sharp knife edge 67. In this preferred embodiment of my invention, the diameter of the inner wall 73 of the flange portion 71 is approximately one-eighth inch greater than the outside diameter of the outer surface 75 of the lower wall portion 33 of the housing 11 and adjacent the terminal edge 37 thereof. Referring specifically to FIG. 3 for illustration, it will be observed that each of the eight lugs 72 has a generally boat-shaped vertical configuration extending vertically from the base portion 70 to closely adjacent the upper edge 76 of the flange portion 71 and includes a flat, or gently curved central portion 77 which defines the innermost axial extent of each lug 72, and, continuous therewith, curved side portions 78 and 79 extending to and interjoining the central portion 77 with the inner wall 73 of the flange portion 71. The central portions 77 of the eight lugs 72 are adapted to frictionally engage the outer surface 75 of the housing 11 adjacent the lower terminal edge 37 thereof when the tray 13 is assembled with the housing 11. To induce a radial inwardly directed force on each of the lugs 72 against the outer surface 75, the central portion 77 of each lug 72 is dimensioned to protrude inwardly from the inner wall 73 of the flange portion 71 a distance slightly greater than one-sixteenth of an inch. Consequently, when the flange portion 71 is moved axially over the open end of the housing 11 in assembling the tray 13 therewith, the lugs 72 require more than the provided one-sixteenth of an inch spacing between the outer surface 75 of the housing 11 and the inner wall 73 of the flange portion 71, thereby circumferentially stressing and elastically straining the flange portion 71 to induce a corresponding radial constricting force in the lugs 72 to press their central portions 77 against the outer surface 75 of the housing 11. With reference to this aspect of my invention, it will be understood that by increasing the extent to which the central portion 77 of the lugs 72 protrude inwardly from the inner wall 73, the circumferential strain imposed on the flange portion 71 is correspondingly increased. As shown in FIG. 3, this circumferential strain on the relative thin flange portion 71 causes the upper part of the flange portion 71 to assume a parachordal configuration between adjacent lugs 72. It has been found that by constructing the tray gripping means in the above-described manner, several advantages are derived. First, by forming the flange portion 71 of the tray 13 somewhat larger than the outer surface 75 of the housing 11, the tray 13 is easily gripped for careful removal from the housing 11, and concomitantly, the tray 13 is readily engaged with the housing 11. Secondly, the spaced lugs 72, having a boat-shape, provide an outwardly flared mouth which serves to guide the initial engagement of the tray 13 with the housing 11, while utilizing a substantially cylindrical flange portion 71. Further, and importantly, while the lugs 72 must be capable of frictionally gripping the housing 11 to a degree which will retain the tray 13 in assembly with the housing 11 with a full charge of chopped food in the food shredding chamber to permit the shredder 10 to be lifted by its housing 11 and transported to a receptacle, the degree of such gripping by the lugs 72 must be readily overcome by moderate manual effort to permit the careful removal of the tray 13 to control the discharge pattern of the shredded food from the shredding chamber. I have found that by forming the lugs 72 to extend inwardly to an extent such that in imaginary circle defined by their collective central portions 77 defines a diameter approximately 0.010 inches less than the diameter of the associated outer surface 75 of the housing 11, the desired degree of gripping by the lugs 72 in this embodiment is obtained. It will be readily appreciated that the described construction of the tray gripping means is ideally suited for modification, using standard molding techniques, by varying the described differences in lug and housing diameters to suit various construction materials, tray diameters and desired gripping forces. For example, the lugs may be formed with the housing and arranged to frictionally engage the inner wall of the flange of the tray. In a further modification, the lugs 72 are formed separately of a rubberlike material such as, for example, neoprene, and are mounted in a subsequent step to the tray which is initially formed without lugs. In this modification the lugs are compressible, and, when constrictingly engaged with the outer surface 75 of the housing 11, their central portions 77 are elastically deformed to assume contour of the outer surface 75. Thus, in addition to the relatively high frictional relationship between the neoprene lugs and the polyethylene housing, a substantial surface of each lug is brought to bear frictionally against the housing 11, thereby providing a suitable tray gripping effect.

As described hereinbefore, the knife blade 40 is mounted within the housing 11 for reciprocal movement toward and away from the bottom end 37. As thus arranged, and with tray 13 assembled with the housing 11, the knife edge 67 of the knife blade 40 passes downwardly through the shredding chamber 61 to a limit position against the upper surface 74 of the base portion 70 as the knife blade 40 is normally depressed through its cutting stroke. Thus, the tray 13 with its hard nonabsorptive upper surface 74 serves as a self-contained food cutting surface so that an accessory cutting board is unnecessary and the shredder 10 may be operated upon any convenient relatively flat surface. In addition, the removability of tray 13, as selected, permits the chopped ingredients within chamber 61 to be transported to a remote container for discharge at the operator's convenience.

I claim:

1. A vegetable shredder comprising: a bell-shaped housing open at the base end thereof and mounting a shredding mechanism having a blade arranged for reciprocal movement within said housing between an extended position at said base end and a retracted position inwardly thereof, and a tray removable attached to said housing over said base end and enclosing the opening therein, said tray and said housing being cooperable to define a completely enclosed shredding chamber therewithin.

2. The invention of claim 1, wherein said tray includes a central planar portion and an integral upturned flange along the perimeter thereof, the interior wall surface of said flange having a perimetrical configuration corresponding to, and larger than, said base end of said housing adjacent the open end thereof, and a plurality of lugs disposed in the space between said base end and said interior wall surface at individual spaced positions therealong, said lugs being arranged and adapted to frictionally interconnect said tray and said housing.

3. The invention of claim 2 wherein said lugs are attached to said housing and protrude outwardly therefrom to frictionally engage said interior wall surface of said upturned flange to removable interconnect said tray with said housing.

4. The invention of claim 2 wherein said lugs are attached to said upturned flange and protrude inwardly from said interior wall surface thereof, said lugs having a crown portion arranged to mutually contact and frictionally engage the outer wall of said base end to frictionally interconnect said tray and said housing.

5. The invention of claim 4 wherein said tray is attached to, and removed from said housing by relative axial movement with respect thereto.

6. The invention of claim 5 wherein said crown portion of each of said plurality of lugs is formed of a material having a high coefficient of friction with respect to the material of which said housing is formed.

7. The invention of claim 4 wherein said tray is formed of a material which is springably yieldable, and the perimetrical dimension of a surface developed by common intersections with the said crown portions is less than the corresponding perimetrical dimension of said base end of said housing, the portions of said flange intermediate said lugs being adapted to elastically yield when said lugs are engaged with said outer wall of said base portion, thereby to induce a corresponding radial constriction force upon each said lug to increase the frictional interconnection of said tray with said housing.